United States Patent [19]

Kurnit

[11] 4,439,860
[45] * Mar. 27, 1984

[54] OPTICAL PUMPING IN A WHISPERING MODE OPTICAL WAVEGUIDE

[75] Inventor: Norman A. Kurnit, Santa Fe, N. Mex.

[73] Assignee: The United States of America as represented by the United States Department of Energy, Washington, D.C.

[*] Notice: The portion of the term of this patent subsequent to Jul. 6, 1999 has been disclaimed.

[21] Appl. No.: 291,885

[22] Filed: Aug. 11, 1981

[51] Int. Cl.³ .............................................. H01S 3/091
[52] U.S. Cl. ......................................... 372/70; 372/93; 372/64; 330/4.6
[58] Field of Search ....................... 372/93, 70, 64, 94; 330/4.6

[56] References Cited

U.S. PATENT DOCUMENTS 4,338,570 7/1982 Kurnit ................................... 330/4.6

OTHER PUBLICATIONS

"Optical Surface Waves Along a Torodial Metallic Guide", Marhic et al., Appl. Phys. Lett., 33 (7), Oct. 1, 1978.
"Invariant Properties of Helical-Circular Metallic Waveguides", Marhic et al., Appl. Phys. Lett. 33 (10), Nov. 15, 1978.
"Guided Beams in Concave Metallic Waveguides", Caperson et al., IEEE Jour. Quant. Electron., QE-15, No. 6, Jun. 1979.

Primary Examiner—William L. Sikes
Assistant Examiner—León Scott, Jr.
Attorney, Agent, or Firm—William W. Cochran, II; Samuel M. Freund; Paul D. Gaetjens

[57] ABSTRACT

A device and method for optical pumping in a whispering mode optical waveguide. Both a helical ribbon and cylinder are disclosed which incorporate an additional curvature for confining the beam to increase intensity. An optical pumping medium is disposed in the optical path of the beam as it propagates along the waveguide. Optical pumping is enhanced by the high intensities of the beam and long interaction pathlengths which are achieved in a small volume.

9 Claims, 7 Drawing Figures

OPTICAL PUMPING IN A WHISPERING MODE OPTICAL WAVEGUIDE

BACKGROUND OF THE INVENTION

The present invention pertains generally to lasers and more particularly to optical pumping using optical waveguides. The present invention is closely related to U.S. Pat. No. 4,338,570 issued July 6, 1982, entitled "Raman Scattering in a Whispering Mode Optical Waveguide" by Norman A. Kurnit and U.S. Pat. No. 4,394,623, issued July 19, 1983, entitled "A Ring Cavity for a Raman Capillary Waveguide Amplifier" by Norman A. Kurnit, both of which are incorporated herein by reference for all that they teach. This invention is the result of a contract with the Department of Energy (Contract No. W-7405-ENG-36).

It is often desirable, particularly for infrared and longer wavelengths, to confine radiation to a small mode volume over distances long compared to the distance for which diffraction spreading is appreciable. Hollow dielectric waveguides such as disclosed in E. A. J. Marcatili and R. A. Schmeltzer, "Hollow Metallic and Dielectric Waveguides for long Distance Optical Transmission and Lasers," Bell Syst. Tech. J. 43, 1783 (1964), have been used for such confinement and have had numerous applications to the development of discharge-pumped lasers such as disclosed in R. L. Abrams, "Waveguide Gas Lasers," in *Laser Handbook*, Vol. 3, ed. by M. L. Stitch, North Holland, 1979, p.41, and references therein. Hollow dielectric waveguides have also been used for absorption spectroscopy such as disclosed in M. A. Guerra, A. Sanchez, and A. Javan, "$\nu=2\leftarrow 1$ Absorption Spectroscopy of Vibrationally Heated NO Molecules Using Optical Pumping in a Waveguide," Phys. Rev. Lett. 38, 482 (1977), optical pumping such as disclosed in M. Yamanaka, "Optically Pumped Waveguide Lasers," J. Opt. Soc. Am. 67, 952 (1977), and stimulated Raman scattering such as disclosed in P. Rabinowitz, A. Kaldor, R. Brickman, and W. Schmidt, "Waveguide $H_2$ Raman Laser," Appl. Opt. 15, 2005 (1976); N. A. Kurnit, G. P. Arnold, L. M. Sherman, W. H. Watson, and R. G. Wenzel, "$CO_2$-Pumped p-$H_2$ Rotational Raman Amplification in a Hollow Dielectric Waveguide," Conference on Lasers and Electro-optic Systems, CLEOS/ICF '80, San Diego CA, Feb. 1980. However, very long lengths of such dielectric waveguides are cumbersome and difficult to construct particularly since tight tolerances with regard to straightness are required in order to prevent conversion into lossy higher-order modes.

Bent rectangular metallic waveguides have been studied extensively by E. Garmire, T. McMahon, and M. Bass, "Propagation of Infrared Light in Flexible Hollow Waveguides," Appl. Opt. 15, 145 (1976); E. Garmire et al., "Flexible Infrared-Transmissive Metal Waveguides," Appl. Phys. Lett. 29, 254 (1976); E. Garmire et al., "Lowloss Optical Transmission Through Bent Hollow Waveguides," Appl. Phys. Lett. 31, 92 (1977); E. Garmire et al., "Lowloss Propagation and Polarization Rotation in Twisted Infrared Metal Waveguides," Appl. Phys. Lett. 34, 35 (1979); E. Garmire et al., "Flexible Infrared Waveguides for Highpower Transmission," IEEE J. Quant, Electron., QE-16, 23 (1980), as a means of steering $CO_2$ laser radiation for cutting, welding, and surgery. The principal disadvantage of bent rectangular metallic waveguides is that the walls perpendicular to the electric field give a relatively large attenuation coefficient. For straight metallic waveguides, it has been demonstrated, however, that the walls perpendicular to the electric field may be removed completely if the walls parallel to the electric field are given a slight curvature ($\rho$) which keeps the mode focused in the center of the guide such as disclosed by T. Nakahara and N. Kurauchi, "Guided Beam Waves Between Parallel Concave Reflectors," IEEE Trans. on Microwave Theory and Techniques, MTT-15, 66 (1967); H. Nishihara, T. Inoue, and J. Koyama, "Low-Loss Parallel-Plate Waveguide at 10.6 $\mu$m," Appl. Phys. Lett. 25, 391 (1974); H. Nishihara, T. Mukai, T. Inoue, and J. Koyama, "Self-Focusing Parallel-Plate Waveguide $CO_2$ Laser with Uniform Transverse Excitation," Appl. Phys. Lett. 29, 577 (1976). Use of such a waveguide bent in a circle or helix has been previously proposed by M. E. Marhic, L. I. Kwan, and M. Epstein, "Optical Surface Waves Along a Toroidal Metallic Guide," Appl. Phys. Lett. 33, 609 (1978); M. E. Marhic et al., "Invariant Properties of Helical-Circular Metallic Waveguides," Appl. Phys. Lett. 33, 874 (1978), M. E. Marhic et al., "Whispering Gallery $CO_2$ Laser," IEEE J. Quantum Electron. QE-15, 487 (1979); L. W. Casperson and T. S. Garfield, "Guided Beams in Concave Metallic Waveguides," IEEE J. Quantum Electron. QE-15, 491 (1979), for flexible guiding of $CO_2$ laser radiation and the construction of a $CO_2$ laser. However, these are the only disclosed uses of this device.

SUMMARY OF THE INVENTION

It is therefore an object of the present invention to provide an improved device for optically pumping a laser optical pumping medium.

It is also an object of the present invention to provide a device for confining an optical beam over long interaction path lengths at high intensities.

Another object of the present invention is to provide a device for confining an optical beam over long interaction path lengths at high intensities in a compact volume.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention may comprise a device for optically pumping a laser optical pumping medium by an optical beam propagated by a waveguide comprising waveguide means having a substantially cylindrical surface with a radius R for propagating said optical beam in a helical direction along said cylindrical surface, said cylindrical surface having an additional curvature formed therein with a radius $\rho$ which confines said optical beam to a small mode volume and a high intensity as said optical beam propagates along said waveguide means; means for confining said optical pumping medium in the propagation path of said optical beam as said optical beam propagates along said waveguide means to optically pump said laser optical pumping medium; whereby optical pumping and energy inversion is achieved in said device by providing long interaction path lengths between said optical beam and optical pumping medium at high intensities.

The present invention may also comprise, in accordance with its objects and purposes, a device for optically pumping a laser optical pumping medium by an optical beam propagated through a gaseous optical pumping medium comprising an optical beam; waveguide means having a substantially cylindrical surface with a radius of curvature R for propagating said optical beam; groove means formed in a substantially helical path along said cylindrical surface of said waveguide for confining said optical beam to a small mode volume and high intensity as said optical beam propagates along said cylindrical surface in a helical propagation path in said groove means, said groove means having a radius of curvature $\rho$ which is transverse to said radius of curvature R; a gaseous optical pumping medium disposed in said helical propagation path of said optical beam; whereby optical pumping of said optical pumping medium is enhanced by providing long interaction lengths with said gaseous optical pumping medium at high intensities.

The present invention may also comprise, in accordance with its objects and purposes, a device for optically pumping a laser optical pumping medium by an optical beam propagated through a gaseous optical pumping medium comprising an optical beam; waveguide means having a substantially cylindrical surface with a radius of curvature R for propagating said optical beam; groove means formed in a substantially helical path along said cylindrical surface of said waveguide for confining said optical beam to a small mode volume and high intensity as said optical beam propagates along said cylindrical surface in a helical propagation path in said groove means, said groove means having a radius of curvature $\rho$ which is transverse to said radius of curvature R; a gaseous optical pumping medium disposed in said helical propagation path of said optical beam; an optical ring cavity coupled to said device; whereby optical pumping of said optical pumping medium is enhanced by providing long interaction lengths with said gaseous optical pumping medium at high intensities.

The advantages of the present invention are that the optical beam can be propagated with a small mode volume and consequently at a higher intensity over long pathlengths. This enhances optical pumping of the medium. Additionally, by bending the waveguide into a helix or spiral, long pathlengths can be achieved in a compact volume without the requirements of tight tolerances of straight dielectric waveguides. Also, the beam remains confined in a region near the outer wall, so that the second wall utilized by T. Nakahara and N. Kurauchi, "Guided Beam Waves Between Parallel Concave Reflectors," IEEE Trans. on Microwave Theory and Techniques, MTT-15, 66 (1967); H. Nishihara, T. Inoue, and J. Koyama, "Low-Loss Parallel-Plate Waveguide at 10.6 $\mu$m," Appl. Phys. Lett. 25, 391 (1974); H. Nishihara, T. Mukai, T. Inoue, and J. Koyama, "Self-Focusing Parallel-Plate Waveguide $CO_2$ Laser with Uniform Transverse Excitation," Appl. Phys. Lett. 29, 577 (1976), can be removed. This greatly simplifies the fabrication process since only a single curved boundary is required which, consequently, greatly reduces fabrication costs.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE PREFERRED EMBODIMENT OF THE INVENTION

Figure 1:
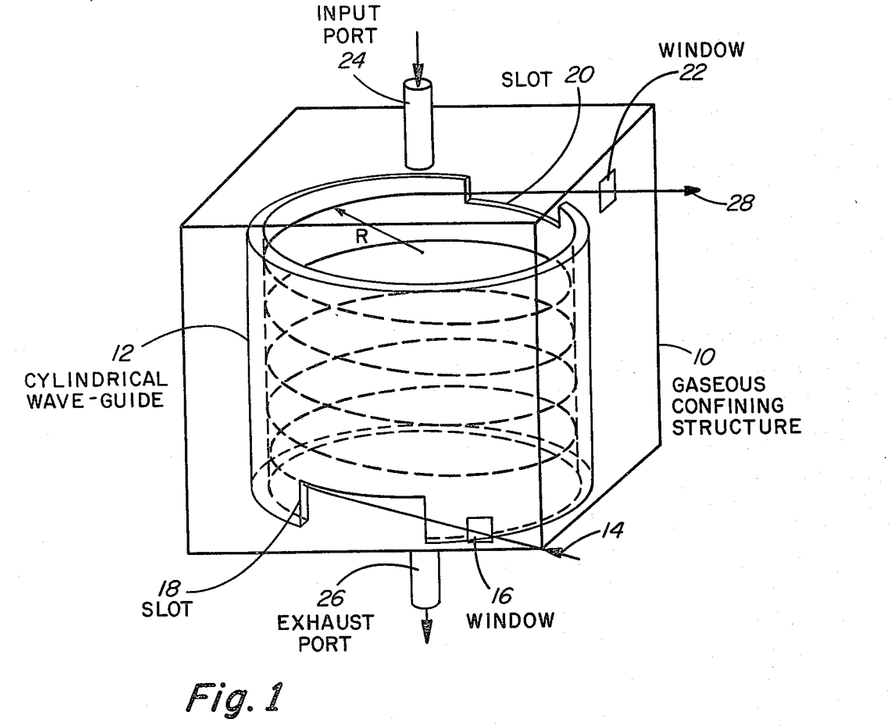
FIG. 1 is a schematic perspective view of the cylindrical waveguide of the present invention.

FIG. 1 discloses a schematic perspective view of the cylindrical waveguide device of the present invention. As illustrated in FIG. 1, a gaseous confining structure 10 surrounds a cylindrical waveguide 12. An optical pumping beam 14 is directed through the gaseous confining structure 10 via antireflection-coated or Brewster-angle window 16. The optical beam 14 is directed through slot 18 in cylindrical waveguide 12 so that the optical beam 14 impinges upon the inner surface of cylindrical waveguide 12 at a small incidence angle. The optical beam 14 is then directed around the inner surface of cylindrical waveguide 12 by a series of minute reflections so that it "whispers" along the inner surface in the same manner disclosed by Lord Rayleigh (J. W. Strutt), Theory of Sound, § 287, MacMillan, 1894, Vol. 2, p. 126; Lord Rayleigh, "The Problem of the Whispering Gallery," Phil. Mag. 20 1001 (1910) (Scientific Papers, Vol. 5, Cambridge Univ. Press, 1912, p. 617); Lord Rayleigh, "Further Application of Bessel's Functions of High Order to the Whispering Gallery and Allied Problems," Phil. Mag. 27, 100 (1914) (Scientific Papers, Vol. 6, Cambridge Univ. Press, 1920, p. 211), in connection with the "whispering gallery" phenomenon in St. Paul's Cathedral. The pitch of the optical beam 14 causes it to form a helical path around the inner surface of cylindrical waveguide 12 before it is emitted by slot 20 and window 22. Input 24 provides an optical pumping medium to the gaseous confining structure 10. The optical pumping medium is maintained in the gaseous confining structure 10 at a predetermined pressure and exhausted by exhaust port 26. As the optical beam 14 is transmitted along the inner surface of cylindrical waveguide 12, optical pumping occurs due to the high intensity and long interaction length of the beam with the optical pumping medium. As a result, output 28 contains both $CO_2$ and the optically pumped output frequency. Of course, any desired optical pumping medium can be used, including, but not limited to, various isotopic species of $NH_3$, $CF_4$, $CH_4$, etc.

Figure 2:
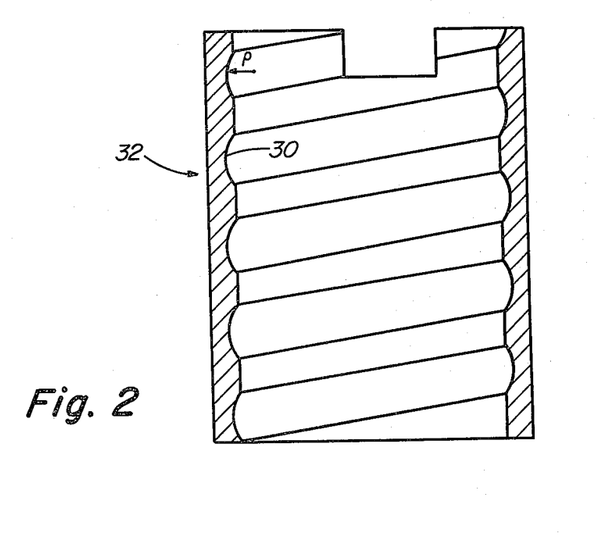
FIG. 2 is a schematic cross-sectional view of the cylindrical waveguide of the present invention.

FIG. 2 is a schematic cross-sectional diagram of the cylindrical waveguide of the present invention. As disclosed in FIG. 2, a curvature $\rho$ is formed along the inner surface 30 of the cylindrical waveguide 32. The curvature $\rho$ is formed in a helical path to correspond to the helical path of an optical beam transmitted around the inner surface of the cylindrical waveguide 32. The curvature $\rho$ functions to confine the mode of the optical beam so that it maintains a high intensity as it is transmitted along the inner surface of the groove. In other words, the curvature $\rho$ functions to refocus the beam at each bounce to keep it confined to a small volume and, consequently, a high intensity as it travels around the inner surface of the cylindrical waveguide 32. The higher intensities enhance optical pumping of the medium.

An attractive feature of the cylindrical waveguide illustrated in FIGS. 1 and 2 is that for light polarized tangential to the surface of the cylindrical waveguide, the glancing-incidence reflectivity of metals in the infrared approaches 100% as the incidence angle $\theta$ becomes small. For a highly reflecting metal in the infrared, the loss per bounce is given by $A \cong A_n \sin \theta \sim A_N \theta$, where $A_N = 1 - R_N$ is the normal incidence loss, such as discussed by E. Garmire, Appl. Opt. 15, 3037 (1976); E. Garmire, T. McMahon and M. Bass, Appl. Phys. Letters 31, 92 (1977); IEEE J. Quant, Electron. $QE$-16, 23 (1980); and, H. Krammer, Appl. Opt. 16, 2163 (1977), 17, 316 (1978). Consequently, for N successive reflections through an angle $\phi = 2N\theta$, the total loss is given by $NA = A_N \phi/2$, which is independent of the radius R of the bend. In other words, the total loss of energy is not dependent upon the radius of the waveguide but only upon the total angle which the waveguide traverses. For one complete revolution, the loss is $\sim \pi A_N$, which is on the order of 4% or less for infrared radiation polarized tangential to the cylindrical surface.

As a result of the loss being independent of the radius R of the cylindrical waveguide, long pathlengths can be achieved with low loss using a cylindrical waveguide with a large radius R. Moreover, the loss is distributed over a large surface area so that damage thresholds are very high. This results from both the surface loss being proportional to $\sin \theta$ and the beam being spread on the surface (relative to its cross-section, by an additional factor of $\sin \theta$). Thus, the energy density which the reflective surface can handle without damage is increased by $1/\sin^2 \theta$ compared to the same surface at normal incidence.

Figure 3:
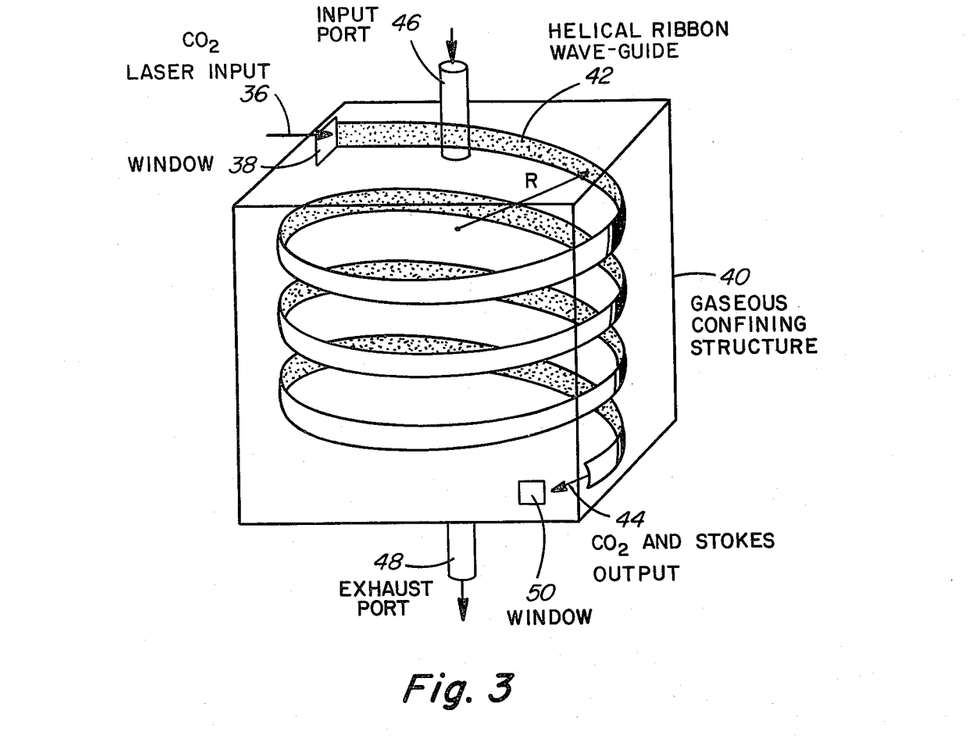
FIG. 3 is a schematic perspective view of a helical ribbon waveguide of the present invention.

FIG. 3 illustrates the helical ribbon waveguide of the present invention. As illustrated in FIG. 3, an optical beam 36 is inserted through window 38 of gaseous confining structure 40 so that it impinges upon the helical ribbon waveguide 42 at a small incidence angle $\theta$. The helical ribbon waveguide 42 has a radius of curvature R and is formed in a helical pattern to transmit optical beam 36 through the gaseous confining structure 40. Input port 46 provides an optical pumping medium at a predetermined pressure within the gaseous confining structure 40 which is exhausted by exhaust port 48. Window 50 formed in the gaseous confining structure 40 provides an output for output optical beam 44.

Figure 4:
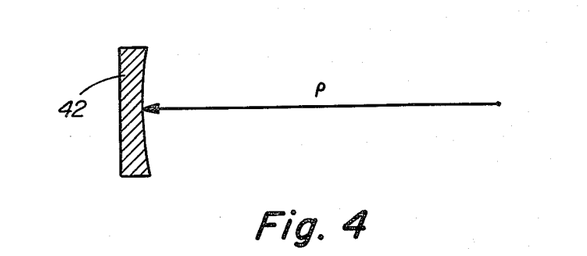
FIG. 4 is a cross-section of the helical ribbon waveguide of the present invention illustrating the curvature $\rho$.

FIG. 4 illustrates a cross-section of the helical ribbon waveguide 42 of FIG. 3. As shown in FIG. 4, the helical ribbon waveguide 42 has an additional curvature $\rho$ formed on the optical reflecting surface in the same manner as illustrated in FIG. 2. Again, curvature $\rho$ functions to confine the optical beam to a small mode volume to increase intensity and thereby enhance optical pumping.

The advantage of the helical ribbon waveguide 42 illustrated in FIGS. 3 and 4 is that it can be bent to any desired radius R unlike the solid cylinder illustrated in FIGS. 1 and 2. As stated previously, the change in radius R does not affect losses of the waveguide but merely shortens or lengthens the beam path. Additionally, the radius R of the helical ribbon waveguide 42 can be made progressively larger or smaller to produce a spiral waveguide if desired.

Figure 5:
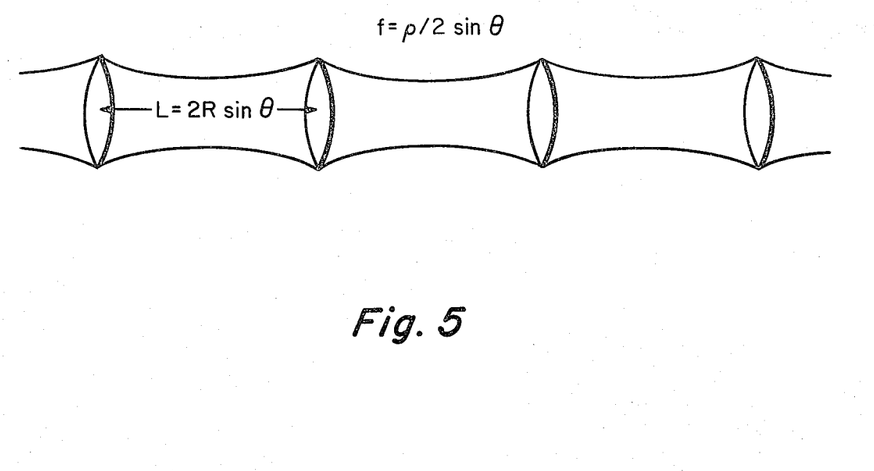
FIG. 5 is a schematic illustration of the equivalent lens waveguide of the device of the present invention.

The focusing effects, or mode confinement in the transverse direction of the curvature $\rho$ illustrated in FIGS. 2 and 4, can be calculated using a standard lens waveguide approach given, for example, in *An Introduction to Lasers and Masers* by A. E. Seigman, McGraw Hill, 1971, Ch. 8, by considering the reflection from successive cylindrical mirrors of radius $\rho$, with an angle $\theta$ to the tangent, giving a focal length $f = \rho/(2 \sin \theta)$, separated by a distance $L = 2R \sin \theta$. The equivalent lens waveguide is illustrated in FIG. 5 and predicts a Gaussian beam in the transverse dimension with $1/e$ radius $w_0 = (\lambda \sqrt{\rho R/\pi})^{\frac{1}{2}}$. For a 10 $\mu$m optical beam with $\rho = 10$ cm and $R = 1$ m, the calculated beam waste $w_0 = 1$ mm. The beam size changes negligibly between a waist and a reflection for small $\theta$. The same analysis predicts that a ray inserted off-axis will oscillate with a repeat distance along the guide of $2\pi \sqrt{\rho R}$.

Figure 6:
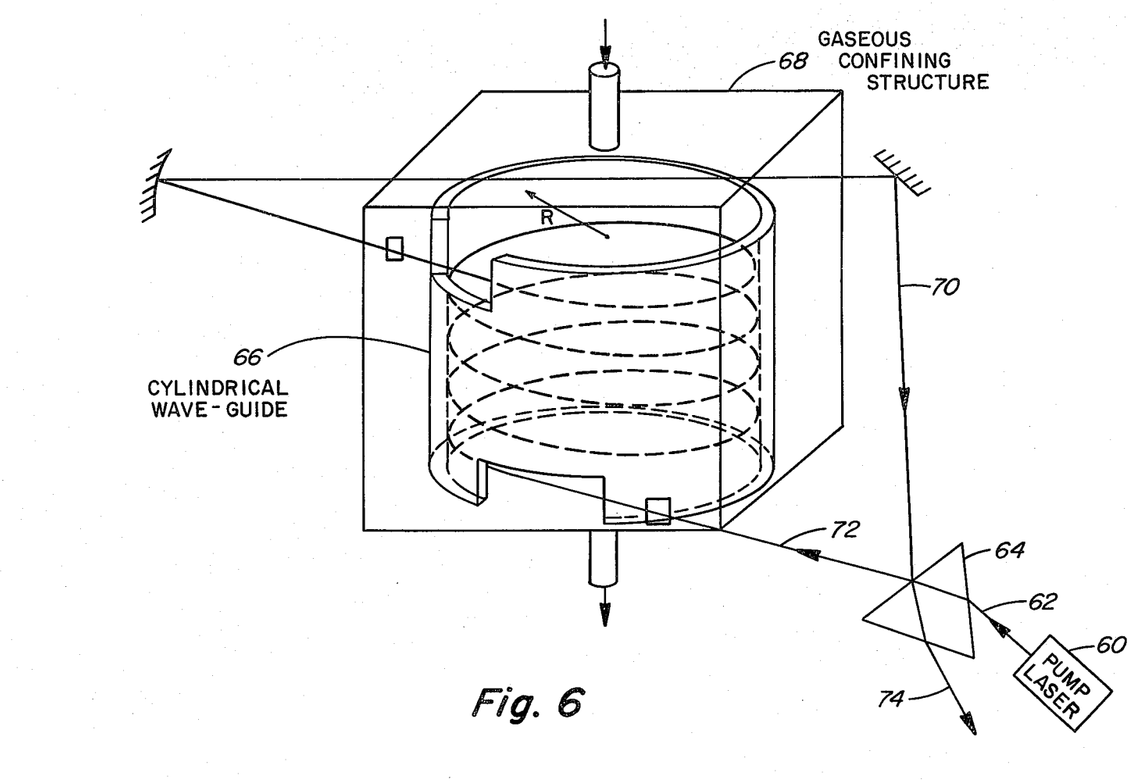
FIG. 6 is a schematic illustration of a ring resonator coupled to the device of the present invention.

FIG. 6 illustrates a ring resonator configuration using the cylindrical waveguide illustrated in FIG. 1. As shown in FIG. 6, pump laser 60 produces a laser pumping beam 62 which is projected through prism 64 for injection into cylindrical waveguide 66 contained within gaseous confining structure 68. An optical pumping medium is maintained within the gaseous confining structure 68 so that optical pumping beam 72 optically pumps the medium as beam 72 proceeds around cylindrical waveguide 66. Output beam 70 contains the optically pumped signal and the optical pump beam 62. Prism 64 splits output beam 70 into two portions. The first portion is transmitted through prism 64 to produce a final output beam 74. The other portion of output beam 70 is reflected by the surface of prism 64 and combined with laser pumping beam 62 to form optical pumping beam 72. Since a significant portion of output beam 70 is reflected by the surface of prism 64, a significant portion of the optically pumped frequency is reinjected into the optical pumping medium for further optical pumping. The arrangement of mirrors or the placement of the input and output apertures should be such that the polarization of the beam fed back is maintained transverse to the cylinder wall and the output of the waveguide is imaged back onto the input. In this manner, the device illustrated in FIG. 6 forms a ring resonator laser which has many advantages over the superradiant lasers illustrated in FIGS. 1 and 3. Of course, the gaseous confining structure 68, illustrated in FIG. 6, can comprise a cryogenic cavity to enhance the optical pumping process.

Figure 7:
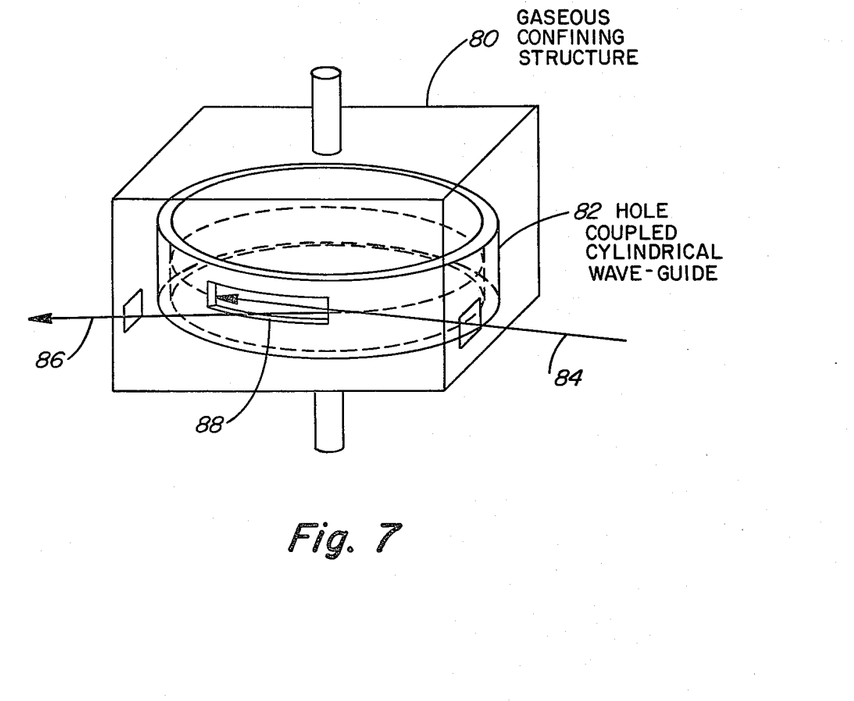
FIG. 7 is a schematic illustration of a hole coupled cylindrical waveguide in accordance with the present invention.

FIG. 7 illustrates a hole coupled cylindrical waveguide 82 which is disposed within a gaseous confining structure 80. In operation, an optical pumping beam 84 is directed into the hole coupled cylindrical waveguide 82 via slot 88. Optical beam 84 is propagated around the inner surface of hole coupled cylindrical waveguide 82 through an optical pumping medium contained within gaseous confining structure 80. Output beam 86 contains the optically pumped signal and optical pumping beam 84. Slot 88 is formed, however, so that only a portion of output beam 86 is emitted from the hole coupled cylindrical waveguide 88, while the remaining portion of output beam is recirculated around hole coupled cylindrical waveguide 82. In this manner, the device of FIG. 7 comprises a true ring resonator.

Consequently, the present invention provides a device and method for optical pumping which increases beam intensity and interaction path length to enhance the optical pumping process. This can be achieved in a relatively small volume and is dependent upon the total angle traversed by the beam rather than the traversed length, so that long interaction lengths are easy to obtain. Moreover, the glancing-incidence reflectivity of metals in the infrared approach 100% as the grazing angle $\theta$ becomes small. For a total change of direction of 360°, losses of 4% or less have been shown. Long interaction lengths also allow the loss to be distributed over a large surface so that damage thresholds remain high on the surface of the cylindrical waveguide. The disadvantages and limitations of tight tolerances of straightness or long lengths encountered with dielectric waveguides are eliminated in the device of the present invention. Moreover, since the optical beam is confined to a region on a single reflective surface, the device of the present invention can be fabricated in a simple and easy manner. The present invention has particular utility with lasers having a low energy output, such as, low intensity cw lasers which would be desirable for use in optical pumping.

The foregoing description of the preferred embodiment of the invention has been presented for purposes of illustration and description. It is not intended to be exhaustive or to limit the invention to the precise form disclosed, and obviously many modifications and variations are possible in light of the above teaching. For example, the waveguide of the present invention can be used for discharge pumped lasers, absorption spectroscopy, ring resonators, optical delay lines, the study of adsorbed molecules or thin surface films such as disclosed by R. W. Hannah, "An Optical Accessory for Obtaining the Infrared Spectra of Very Thin Films," Appl. Spectroscopy 17, 23 (1963); G. W. Poling, "Infrared Reflection Studies of the Oxidation of Copper and Iron," J. Electochem. Soc. 116, 958 (1969), if used with an electric field polarized perpendicular to the surface. Additionally, a cylindrical surface of an absorbing material turned inward in a single spiral turn could provide a convenient beam dump or calorimeter for high power laser radiation since the radiation would be absorbed over a large surface area after many reflections, and very little light scattered would be able to exit the device. The device could also possibly be used for an acousto-optical cell. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An optical pumping apparatus which comprises in combination:
   a. an active laser medium capable of laser action at a first wavelength;
   b. means for producing a beam of laser radiation having a second wavelength, said second wavelength radiation being capable of interacting with said active laser medium to produce a population inversion therein suitable for generating said laser action at said first wavelength;
   c. waveguide means having a substantially cylindrical surface with a radius R for propagating said second wavelength radiation in a helical direction along said cylindrical surface, said cylindrical surface having an additional curvature formed therein with a radius $\rho$ which confines said second wavelength radiation to a small mode volume and a high intensity as said second wavelength radiation propagates along said waveguide means;
   d. means for introducing said second wavelength radiation into said waveguide means;
   e. means for confining said laser medium in the propagation path of said second wavelength radiation as said second wavelength radiation propagates along said waveguide means whereby a substantial interaction length of said high intensity of said second wavelength radiation and said laser medium is formed, thereby producing said population inversion in said laser medium and said laser action at said first wavelength therefrom; and
   f. means for extracting said first wavelength of laser radiation from said waveguide means.

2. The apparatus as described in claim 1, wherein said waveguide means includes a helical coil.

3. The apparatus as described in claim 1, wherein said waveguide means includes a grooved cylinder.

4. The optical pumping apparatus as described in claim 1, wherein said extraction means for said first wavelength includes an optical resonant ring cavity optically coupled to said waveguide means.

5. The optical pumping apparatus as described in claim 1, wherein said second wavelength introducing means includes an optical resonant ring cavity optically coupled to said waveguide means.

6. An optical pumping apparatus which comprises in combination:
   a. an active laser medium capable of laser action at a first wavelength;
   b. means for producing a beam of laser radiation having a second wavelength, said second wavelength radiation being capable of interacting with said active laser medium to produce a population inversion therein suitable for generating said laser action at said first wavelength;
   c. waveguide means having a substantially cylindrical surface with a radius R for propagating said second wavelength radiation in a helical direction along said cylindrical surface, said cylindrical surface having an additional curvature formed therein with a radius $\rho$ which confines said second wavelength radiation to a small mode volume and a high intensity as said second wavelength radiation propagates along said waveguide means;
   d. means for introducing said second wavelength radiation into said waveguide means and for extracting said first wavelength of laser radiation from said waveguide means; and
   e. means for confining said laser medium in the propagation path of said second wavelength radiation as said second wavelength radiation propagates along said waveguide means whereby a substantial interaction length of said high intensity of said second wavelength radiation and said laser medium is formed, thereby producing said population inversion in said laser medium and said laser action at said first wavelength therefrom.

7. The apparatus as described in claim 6, wherein said waveguide means includes a helical coil.

8. The apparatus as described in claim 6, wherein said waveguide means includes a grooved cylinder.

9. The optical pumping apparatus as described in claim 6, wherein said means for introducing said second wavelength radiation into said waveguide means and for extracting said first wavelength of laser radiation from said waveguide means includes an optical resonant ring cavity optically coupled to said waveguide means.

* * * * *